Nov. 11, 1958  V. E. GLEASMAN  2,859,641
DIFFERENTIAL GEAR MECHANISM
Filed Feb. 21, 1955  4 Sheets-Sheet 1
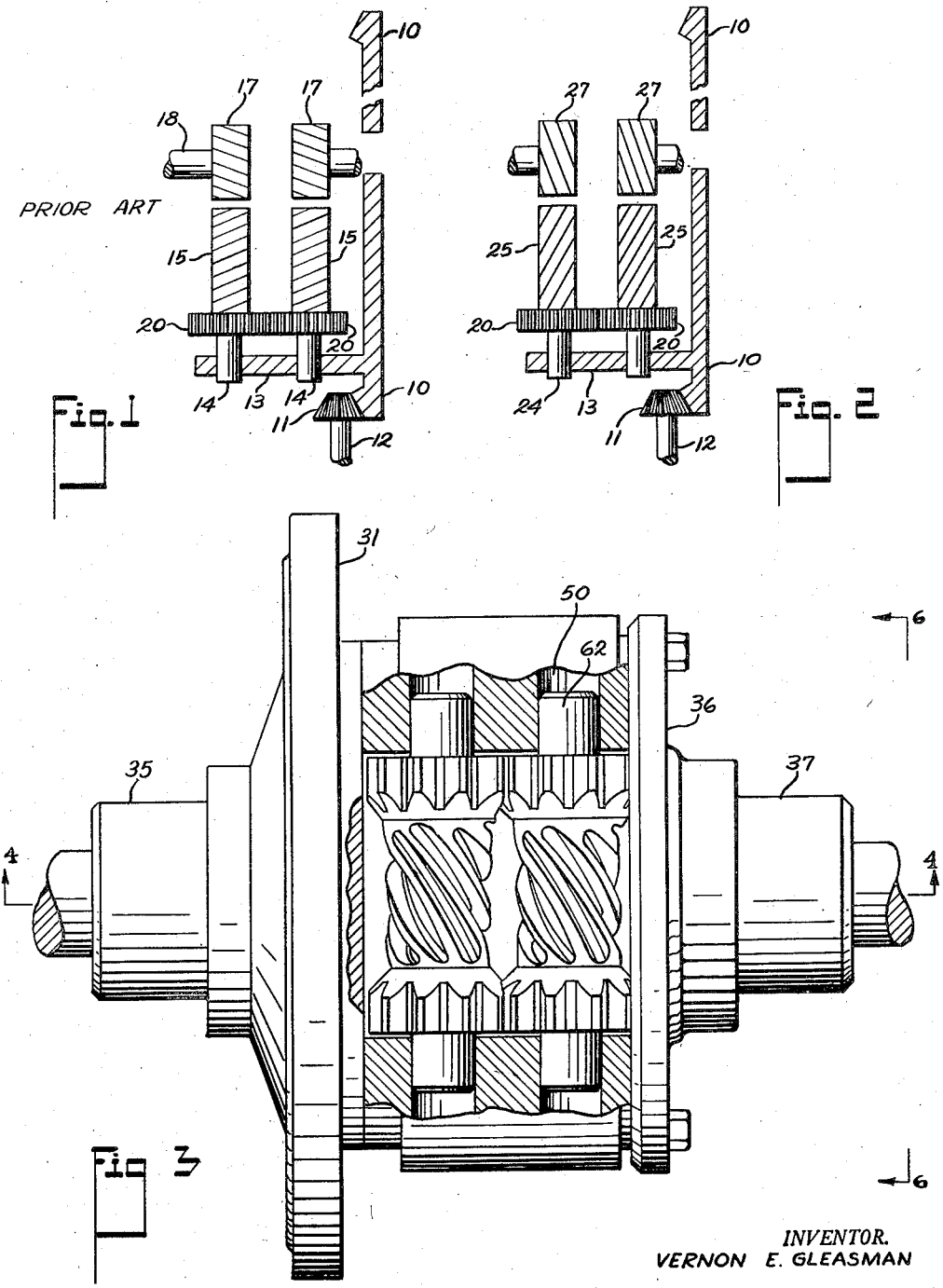
INVENTOR.
VERNON E. GLEASMAN
BY
*J. D. Douglas*
ATTORNEY

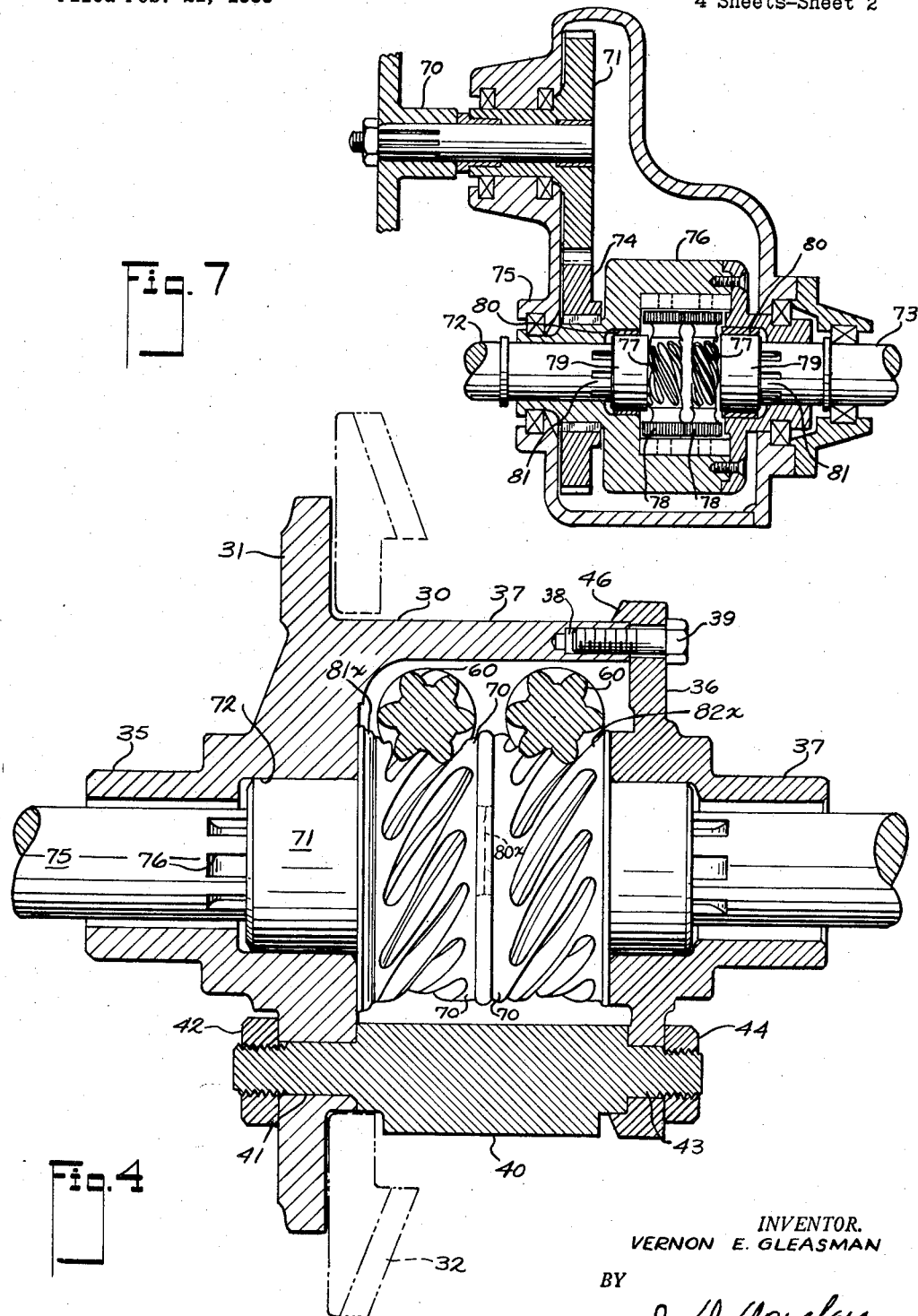

INVENTOR.
VERNON E. GLEASMAN
BY
J. D Douglas
ATTORNEY

Nov. 11, 1958 V. E. GLEASMAN 2,859,641
DIFFERENTIAL GEAR MECHANISM
Filed Feb. 21, 1955 4 Sheets-Sheet 4
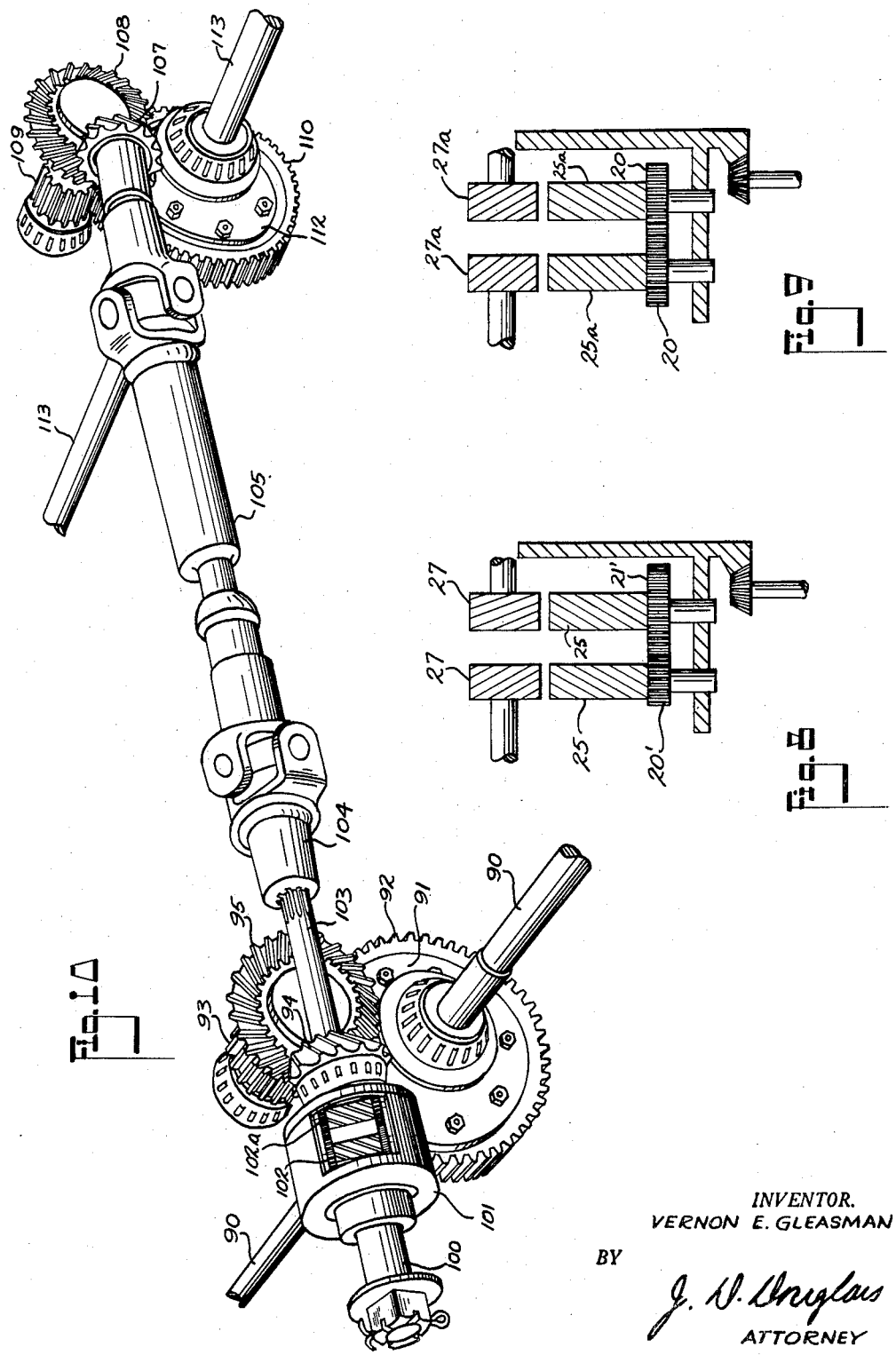
INVENTOR.
VERNON E. GLEASMAN
BY
*J. D. Douglas*
ATTORNEY

United States Patent Office 2,859,641
Patented Nov. 11, 1958

2,859,641

DIFFERENTIAL GEAR MECHANISM

Vernon E. Gleasman, Cleveland Heights, Ohio

Application February 21, 1955, Serial No. 489,373

11 Claims. (Cl. 74—715)

This invention relates to improvements in differential gearings or the like and more particularly to an improvement in differential gearings of the type sometimes referred to as "positive drive."

In order to provide a clearer understanding of my invention, I have illustrated first the prior art, as exemplified by the Alcorn Patent 1,354,937, and will first describe its operation after which reference will be had to my invention which overcomes all the difficulties of the prior art.

The ultimate objective, which has never been obtained prior to my invention, has been to develop a mechanical device which will distribute torque equally to the two driven traction gears under any condition of relative motion as dictated by ground speed but never permitting torque to be applied to any one wheel in excess of the available traction without causing both wheels to slip simultaneously.

In the drawings:

Fig. 1 is a diagrammatic showing of a differential of the prior art with certain parts removed from contact with the other for clarity of explanation and disclosure;

Fig. 2 is a similar view of the improved gearing of my invention;

Fig. 3 is a view mostly in elevation but with parts of the housing broken away to slow the portion of the differential gears;

Fig. 4 is a section taken on the line 4—4 of Fig. 3 with the traction gears and figments of the axles shown in elevation and showing in dashed lines the position taken by the ring gear;

Fig. 7 is a sectional view through a transfer case embodying my invention;

Fig. 8 is a diagrammatic view showing a different arrangement of balancing gears;

Fig. 9 is a diagrammatic view showing side and transfer gears having different lead angles to the teeth; and Fig. 10 is a perspective view of a bogie wherein the gearing of my invention may be used.

Figure 5:
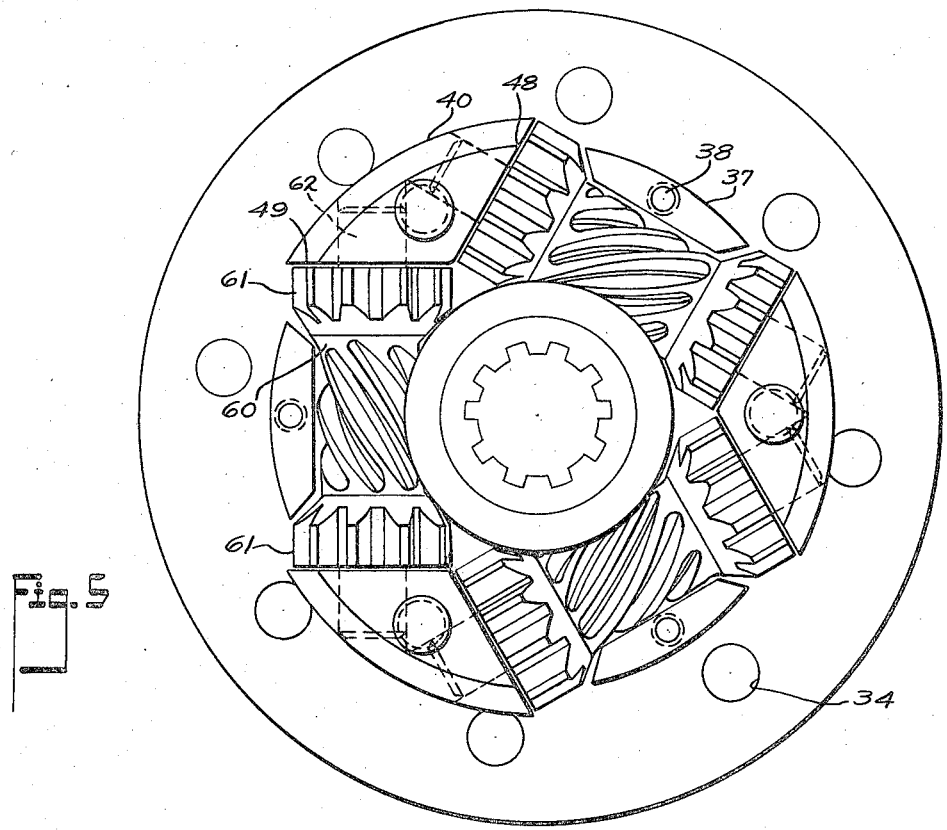
Fig. 5 is a view with the cap removed looking into the end.

In the prior art, as shown diagrammatically in Fig. 1, a conventional ring gear 10 is driven by a pinion 11 from a shaft 12 which may be connected through the usual clutch and transmission to a power plant. The ring gear carries a differential cage 13 in which are journalled the stub ends of shafts 14; the body of each shaft carries a worm or transfer gear 15. It will be apparent that when the ring gear is rotated these gears are carried in a circular orbit, the longitudinal axis of the gears being tangent to the circle. The transfer gears or worms are in mesh with the side gears 17 that are connected to the axles 18 which in turn are connected to the wheels of the vehicle in the usual manner. Since the transfer gears are worms and the side gears are worm wheels, it will be appreciated that the travel of the worm gear teeth is in an orbit that passes through the pitch line of the side gears, and that the worms will push the worm wheel side gears transmitting rotational movement to the shaft 18 without the worms themselves rotating on their own axis because the opposite reaction of the worm wheels on the worms is irreversible.

The amount of effort transferred by the transfer gears to the worm wheels without the opposite reaction causing the worms to rotate on their axis is determined by the helix angle of the transfer gears. It will be appreciated that the angle of the teeth on both gears are such that proper meshing will occur and that when the helix angle of the worm is changed the angle of the teeth on the worm wheel must change accordingly. If the helix angle is small, all of the effort from the ring gear, minus the internal friction, will be transferred to the side gears. This helix angle can be varied from zero to 45° as considered from the axis of the traction gear. At 45°, however, it will be appreciated that the terminology of worm and worm wheels no longer applies because one gear can drive the other gear without any irreversible action, and, in this case, no positive driving of the wheels could occur. In the last mentioned instance it would be necessary to supply spur gears 20 for each transfer gear, which spur gears would be in mesh with each other, in order to enable the drive to be effected because at 45° the transfer gears would turn on their axes and transmit substantially no power to the side gears, the action of the transfer and traction gearing being reversible. At the other end of the range of the helix angle of the transfer gears it can be seen that there is a place where the helix angle is so low in order to be a positive drive that the spur gears 20 are not needed because the helix angle of the worm transfer gear would transmit all its effort directly to the side gears with no tendency for it to turn on its own axis. Therefore the differential action would be locked.

It is conventional however to provide the spur gears at all times because normally it is desired to have the helix angle of the worm transfer gear at some point considerably greater than 0° but less than 45°.

Of particular importance in connection with this type of gearing is its operation where one wheel travels faster than the other, as, over uneven terrain, rounding corners, difference in the size of the tires due to a greater wear on one or the other or differences in inflation, and, where one wheel is on ice and the other one on a good traction surface. Assuming that one of the road engaging wheels is attached to the gear on the left side, as viewed in Fig. 1, and is rotating faster than the other, obviously, the left side gear will move at a greater rate of speed than the right side gear. Pressmuing that the helix angle of the worm is such that this effect can be transmitted through the spur gearing to the right hand worm, it will be seen that the increase of speed on the left hand side gear actually reduces the load on the transfer gear for that side and that with this reduction in load an equally greater load is realized on the other transfer gear which is driving the right hand side gear.

In addition, since in order to be operative as a differential, the lead angle of the transfer gear may be such that it can rotate on its axis due to the reactive pressure of the faster traveling traction gear, this rotational force causes the rotation of the other transfer gear in the opposite direction and this force is readily transferred to the worm wheel on the right increasing the power on the slow running wheel. As an extreme example, should this type of differential be put into a vehicle where the cornering ability was such that the inner wheel was standing still and revolving about a perpendicular axes from the ground through the shaft, it will be seen that the vehicle could not be driven, the wheel would merely turn around on solid ground and substantially no power obtained on the outer wheel. Going to a more practical example, where the radius that the inner wheel traveling is smaller and the outer wheel is greater, it will be seen that power is applied to the wheel traveling the shortest distance. This action is undesirable because it puts an undue load upon the worm transfer gears and is largely the reason why such mechanisms have been impractical in the past, namely, because the power applied to the slower running wheel unduly wears or breaks the gearing. There is a limit to the size of gearing that may be used inasmuch as the gearing is made larger the road clearance becomes less.

As can be seen from the above discussion, the greatest driving effort from the worm wheels is through the transfer gears to the side gears, and the spur gears connecting the transfer gears have substantially no load thereon, and, the amount of load is dependent on the change in the helix angle from zero towards 45°. At 45° the entire effort transferred by the transfer gears to the side gears would also be applied through the spur gears. In this instance, however, little positive driving occurs and no advantage is realized over conventional gearing.

I have discovered that an entirely new result and mode of operation is realized by using side gears that are worms and transfer gears that are worm wheels. Fig. 2, shows diagrammatically a differential where the transfer gears are worm wheels and the side gears are worms bigger in diameter than the worm wheels.

As previously stated, the lead angle of the teeth of the transfer gear must be something other than 45° as considered to the axis of the traction gear otherwise little advantage would be derived over a conventional type of gearing. In this case power is applied from the shaft 12 through the pinion 11 to the ring gear 10 and to the differential case 13 which carries the shafts 24. The shafts 24 have mounted thereon and integral therewith the transfer worm wheel 25 and the reversible gears 20 which may be spur gears or the equivalent, and now perform a different function, such, that I properly term them balancing gears. The transfer or differential gears are carried by the gear case in an orbit around the side gears. However, since the helix angle of the transfer gears is now greater than 45° relative to axis of the side gear which is a traction gear, it will be seen that if it were not for the reversible balancing gears no driving effort would be applied to the side gears at all, and since the range is between 45° and 90°, as distinguished between zero and 45° in the prior art, at no time would the transfer gears directly drive the side gears without the balancing gears because the irreversible action is in the opposite direction. Therefore when the transfer gears roate in their orbit there is a tendency, because they are worm gears, for the reactive effort to rotate them around their axes. Since, however, the side gears have the same lead angle to their teeth the tendency is, as long as the wheels have equal traction, to rotate both side gears in the same direction. Because the reversible balancing gears are in mesh with each other and are operating in the same direction, neither one of them can rotate and this effort is then applied to the side gear equally which rotates the side gears. It will be seen, therefore, that, as distinguished from the prior art, at no time can the transfer gears rotate the side gears unless they are innerconnected by balancing gears. Therefore, because of the locking action by the balancing gears, the power is delivered equally to the traction gears and free differential action is maintained at all times.

If, however, one traction gear is rotated at a speed greater than the other, for any of the reasons previously stated, the faster rotating gear, being a worm can easily rotate the transfer gear. Since the one transfer gear is attempting to rotate faster than the other transfer gear and they are connected together, it attempts to rotate the other transfer gear. Because we now have a worm wheel attempting to rotate a worm the irreversible action takes place and the power is immediately thrown back into the fast running wheel, hence the power is still delivered equally to the traction gears and both wheels continue to be supplied with equal amounts of power in spite of the fact that one is traveling faster than the other. It is apparent, however, that this action does not act detrimental to the differential effect because the worm wheels are traveling in an orbit around the worms and that therefore differential action can always take place even though the lead angle of the differential gear is close to 90° relative to the axis of the traction gear.

It will be remembered that in the prior art device when the angle was close to 0° a positive drive was effected but no differential action could take place.

It may therefore be correctly stated that in my improved gearing a different action takes place which is effected by a different instrumentality. In the prior devices the power applied and the traction balance are joint functions. In the present invention they are separate functions, for although the power is applied equally to the transfer gears difference in traction may change the balance through the balancing gears so that a wheel may absorb more of the load depending on tractive resistance of the wheels.

By the proper selection of the lead angle for the teeth of the gears differentials may be constructed, all of which may be positive in their action, but wherein the overall operation may vary. As an example, it may be desirable to provide a differential wherein the balance is such that if one wheel was jacked up the wheel would revolve and not run off the jack and at the same time that same wheel, if it had some traction effort applied to it, would cause the power to be delivered to the other wheel causing it to run off of the jack.

In other words, one differential could be made where the wheel would run freely on a jack and still would not spin on ice. The above would be particularly useful in that should an axle break it would be desirable to have the traction gear on that side spin so that the vehicle would stop in order that damage to the vehicle differential and housing would not occur through broken parts.

I have found that the type of action desired is controlled through the selection of the proper angle for the gears.

For instance, if a positive drive is desired at all times, this being one where the power would be applied to the wheel having traction as well as to the wheel having no traction, which I term a traction ratio of 100:0, or where it is applied 50–50 to the wheels to the point where one wheel would normally lose traction after the friction resistance in one wheel is overcome and where normally all additional power will be applied to the other wheel or, in other words, power is applied to both proportional to the tractive resistance; if the lead angle of the teeth of the transfer gear is 27° to its axis or 63° to that of the traction gear and that of the other gear 63°, such a traction ratio is realized. It should be pointed out that the angle of 27° may vary either way a few degrees depending on the internal friction in the differential. It should also be pointed out that the 100:0 ratio may be obtained through a range from 27° to 2° or 3° but that the lesser angle gives no advantage and actually has less advantage because the shear forces applied to the gears are greatly increased.

As the lead angle of the gear teeth of the transfer gear is changed, and obviously the angle of the teeth of the other gear would also change since the sum of the two angles should always be 90°, the traction effort is changed up until the point where each are at 45° and, as stated, this is without the range because here the power ratio is equal but it no longer has any positive driving qualities. As an example, I have found that by making the transfer gears with a lead angle of 33° and the traction gears at 57° a traction ratio of 80:20 may be realized.

When a differential is desired where the side gear will spin in event of breakage of an axle or the like a lead angle of 35° for the teeth on the transfer gear relative to its axis and 55° on the side gear will permit the proper functioning and still afford a positive drive.

The action in the case where the traction ratio is 100:0 and is such that the drive would be supplied to the wheel having traction and none to the wheel having no traction can best be understood from Fig. 2. Assuming that the left hand wheel connected to the worm or traction gear 27 is free rotate, it will be apparent that the reactive effort from this worm to the worm wheel 25, although in the proper direction to cause the worm wheel to rotate about its axis, is very little, because the worm wheel is traveling in an orbit about the worm and it takes a reaction from the worm to the worm wheel due to ground traction for normal power division movement and this is lacking because there is no ground traction on the free wheel. At the same time the worm wheel on the right, which is traveling in an orbit about the traction gear 27, that traction gear having 100% traction reaction and being a worm, creates a reactive effort tending strongly to rotate the right hand worm wheel 25 about its axes. However, the balancing gears connect the two and since the worm wheel on the left cannot drive the worm on the left, the combination being irreversible, all of the power is directed to the wheel having traction.

It will therefore be apparent that the operation of the device is such that the power is supplied to the wheel in direct proportion to the amount of traction on the wheels. Thus when the vehicle is rounding a corner, so long as both wheels have good traction, the reactive effort on both gears is sufficient to maintain a balance through balancing gears causing an even division of power to the traction gears.

This points out a very decided advantage of this device over the prior art, namely, assuming that a vehicle was rounding a corner with the front wheels turned, the rear wheels would be following behind the front wheels but inside thereof an amount depending upon the sharpness of the turn; this would cause more power to be supplied to the innermost rear wheel causing a definite increase in its tendency to skid. In the present invention since the power is applied equally in the turns, the power is not in an outward direction, as in the other device, but straight ahead, and therefore there is a decreased tendency for the vehicle to skid.

Figure 6:
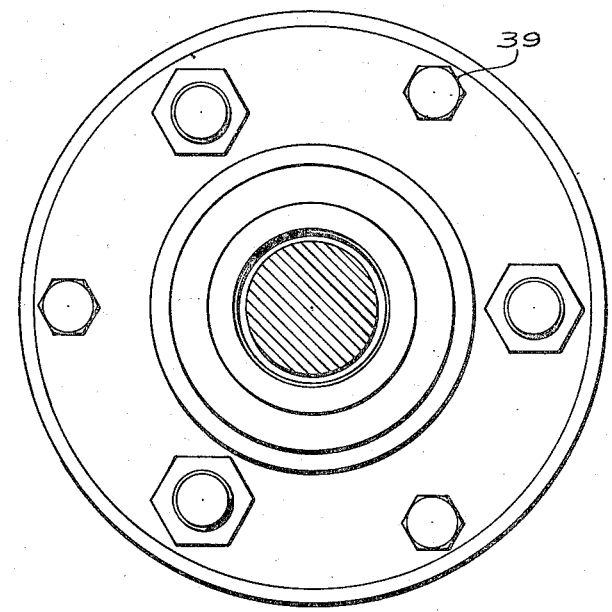
Fig. 6 is a view taken from the line 6—6 of Fig. 3.

Figs. 3 to 6 inclusive illustrate a practical embodiment of my invention as applied to a vehicle. As previously stated, the invention is clearly applicable to differentials of the type shown in my Patents 2,559,916 and 2,631,475 as well as the modifications shown therein. In the above patents it will be noted that there are two pairs of transfers gears disposed on opposite sides and each pair of transfer gears is provided with interengaging reversible gears on opposite ends of the shaft which carries the transfer gears. It will be appreciated that although spur gears are shown it is within the purview of the invention to substitute other types of reversible gears at this point. In the embodiment shown in Figs. 3 to 6, I have illustrated three pairs of transfer gears, each disposed 120° apart. It will be appreciated that, as stated, two such sets of gears may be used or even four or more for different applications, and that in some applications for light duty only one set be used, as shown in Fig. 2.

As shown in the drawings there is provided a cage 30 having a flange 31 to which a ring gear shown in dotted lines in Fig. 4 may be bolted, the flange being provided with holes 34 through which studs or bolts may extend. The one end of the cage is provided with a boss 35 for engagement with a bearing in the differential housing, not shown. The other end of the cage has secured thereto a cap 36 which likewise is provided with a boss 37 for support in a bearing in the differential housing.

Integral with the flange 31, extending normal thereto and 120° apart, are cage portions 37 the ends of which are drilled and threaded at 38 for the reception of cap screws 39 which extend through the cap 36 and are threaded into these portions. Intermediate the segments there are provided three removable posts 40 each of which is provided with a reduced threaded end 41 arranged to extend through the flange 31 and be held in place by nuts 42. The other ends of these posts are likewise reduced and threaded at 43 to extend through openings in the cap and secured thereto by nuts 44. The cap 36 is provided with a peripheral flange 46 which engages with the curved outer face of the parts 37 and the posts 40. The posts 40 are also provided with inner faces each extending at an angle of 120° to the other. Thus with the posts 40 disposed 120° apart and with the faces of each post at 120° to each other there are provided parallel faces between adjacent posts. Each of the faces on the posts is provided with bores 50 in spaced horizontal alignment and extending through to the face normal thereto. Thus bearing means is provided for the transfer gears, each of which includes a worm wheel 60 and on each end a spur gear 61, the ends of which terminate in stub shafts 62 journalled in the bearings 50.

As can best be seen in Fig. 4, the side gears or traction gears comprise multiple teeth worms 70 each having a boss 71 at one side thereof journalled in a plain bearing 72 in the gear case. The structure of the traction gears is substantially the same except that, as can be seen in Fig. 4, one may have a larger boss or hub than the other for engagement in the bearing in the ring gear supporting portion of the housing which is thicker. Each of the traction gears is provided with an internally splined bore for the reception of an exle shaft 75 having the splines 76 thereon. As can be seen in Fig. 3, each pair of transfer gears has the reversible gears in mesh with each other while the worm wheel portions are in engagement with the separate traction gears. Preferably the traction gears are provided with a thrust bearing 80x disposed between the two gears and additional thrust bearings 81x and 82x are provided between the transfer gears and the ends of the gear case.

As can be seen from the disclosure, which is substantially full size, by this construction I am able to incorporate my invention in a differential which may be used in a standard differential housing as they exist today without any enlargement of that housing. By providing three sets of transfer gears I materially increase the strength of the mechanism. The provision of the posts 40, which, when assembled, become a part of the gear case as well as the bearings for the transfer gears, facilitate the assembly, increase the strength and reduce the size.

Although I show the post 40 removable it is understood that in larger housing it may not be required.

In Fig. 7, I have shown a transfer case and its interior gearing in simplified form. As is well known to those versed in the art there is usually provided a coupling 70 which may be connected to the propeller shaft and which drives spur gear 71 rotatably journalled in bearings in a boss in the transfer case. Normally a differential gearing of the usual character is supplied and which connects to and drives a pair of shafts 72 and 73 extending from opposite ends and which connect to front and rear axles for driving the wheels in a four or six wheel drive vehicle. In this instance the gear 71 meshes with a gear 74 journalled on a boss 75 on the differential housing and which gear is locked to or a part of the differential housing 76, the gear 74 fulfilling the driving function for the casing 76 as does the ring gear 32 and flange 31 described in the embodiments of Figs. 3 to 6. The casing 76 can be and preferably is similar to that shown in Fig. 3, or as shown in my Patent 2,559,916. Inasmuch as the space limits in a device of this character may not be as critical as where the invention is used in a differential it will be appreciated that the gears can be made considerably larger but therefore the construction can vary materially from that shown. Likewise, there is a considerable flexibility as to the number of transfer gears that may be used along with the balancing gears.

The transfer gears 77, two of which are shown in the drawings, are connected to each other by the balancing gears 78, and are in mesh with the power takeoff or side gears, the hubs 79 of which are journalled in the bearings 80 provided in the housing. As in the previous device, the hubs are provided with splined bores for receiving the splined ends 81 of the shafts 72, and 73. It will be apparent that with such a device the power will be transferred in the manner previously described to the separate axles. The invention is particularly desirable in connection with multiple driven wheels in that the power may be supplied to the wheels having the greatest traction thus increasing the usefulness of the vehicle.

In Fig. 8, which is a diagrammatic view corresponding to that shown in Fig. 2, I have shown a modification which may be highly desirable. In this case the balancing gears 20' and 21', instead of being of equal ratio as in the previous embodiments, are of different size. It will be apparent that with such a device the power division will not be equal but will depend upon the relative size of the gears. This is particularly desirable when the differential of my gearing is used in the transfer case and where one axle is carrying a greater load than the other axle. Thus if the front axle should have a load of 5 tons and the rear axle a load of 15 tons it may be desirable to provide a normal power division where the greatest percentage of the load is applied to the rear axle and less to the front axle. If the balancing gears had a ratio of 3:1 this would result in a power division of 25% to the front axle and 75% to the rear axle.

In Fig. 9 I have shown how a different balance may be obtained by varying the lead angle of the gears. In this case the traction gears or worms 27a and 27a are in mesh with the transfer gears 25a and 25a, and balancing gears 20 of equal ratio are in mesh with each other. I may desire to provide a lead angle for the transfer gears 25b of 27° and 25a of 35°.

It will be apparent that changes in both the ratio of the balancing gears and the angle of the transfer gears may be combined in one differential thus deriving certain advantages therefrom, such as, increasing the power delivery without going beyond the space limitations.

It will be apparent that the invention is useful in connection with the driving bogies or tandem drive axle units in which each axle would include a differential of my invention and my differential mechanism would be inserted in the drive shaft ahead of the first axle and have separate take offs for the first and second axle which would thus provide coordination between the two sets of wheels.

As shown in the drawings, there are provided the forward and rear axle assemblies, the forward assembly comprising the axle shafts 90 which are connected into a differential where the case 91 has secured to it a ring gear 92 of the spur type driven by a spur gear 93. The spur gear is on a short shaft which is driven by the pinion 94 and bevel gear 95. The rearward of the assemblies is exactly the same. Power is supplied to a shaft 100 which connects with a coordinator case 101 which corresponds to the differential case previously described, the differential gears being shown at 102. In this instance the shaft 103 which is connected to a universal joint 104 at one end extends through the center of the pinion 94 and through an inner side gear which is driven by the differential gears 102a and connects to the side gear which is driven by the differential gears 102. The differential gears 102 and 102a correspond to the gears 25 in Fig. 2 or 60 in Fig. 4, and since the mechanism may be exactly like that shown in Fig. 3, or in other the modifications shown in Figs. 8 or 9, no detailed construction thereof is necessary.

The universal joint 104 connects to a shaft 105 which drives the pinion 107 rotating the bevel gear 108 which rotates the spur gear 109 and drives the rearmost differential ring gear 110 together with the housing 112, which contains the same differential mechanism as described and by means of which the shafts 113 are driven.

It will be appreciated that this construction enables either one of the sets of wheels on the bogie that have traction to drive the vehicle and thus eliminate spinning of wheels that may be engaged with a slippery surface and eliminates reaction between the axles known as wheel fight and all of the undesirable effects experienced. Thus a positive drive is provided for either axle as well as between the axles themselves. Here again, should it be desirable to provide a power division where a greater percentage of the load is applied to one axle over that of the other, it can be effected in the manner described for Fig. 8.

It will thus be seen that I have provided a differential mechanism which overcomes the greatest difficulties apparent in the prior art devices. It enables the vehicle to obtain traction so long as any one of the driving wheels has a traction engaging surface, limiting the spinning of the wheels as is common today. It has the further advantage previously described that the power is supplied to the traction gears equally, when the vehicle is turning, and, eliminating the skidding due to locking of the differential action, such as was possible in the prior art. Thus a greater safety factor is realized and the device may even be used on heavy tractor-trailer vehicles where previously prior positive locking devices were dangerous. It is also apparent that since one wheel will not spin over rough roads there is no cupping of the tires due to the increase in speed while they are in the air and the resultant wear when they strike the pavement.

Although I have described the invention in certain embodiments thereof which have been illustrated by the accompanying drawings it will be apparent that numerous and extensive departures may be made therefrom by those versed in the art and the descriptions and drawings are by way of explanation rather than limitation, and that the invention is only limited as defined in the appended claims.

I claim:

1. A differential gearing comprising a case arranged to be driven from a source of power, a pair of power take-off gears rotatably disposed in said case and arranged for delivering power to different points, a pair of transfer gears having a diameter equal to or smaller than the take-off gears carried by said case and disposed in engagement with said take-off gears and balancing gears connected to each transfer gear and to each other; the power take-off gears being worms and the transfer gears being worm wheels.

2. An apparatus as described in claim 1 where balancing gears are spur gears.

3. A differential gearing comprising a differential gear supporting case, a ring gear carried by the case and means for connection to a power source to rotate the gear ring in said case and comprising worm traction gears in axial alignment with each other and rotatable in said case independent of the rotation of the case and each other, transfer gears in meshing engagement with the traction gears and their axes at right angles to the traction gears and comprising worm wheels rotatably journalled in said case and rotation about their axes and arranged to be carried in an orbit spaced from and concentric with the pitch line of the traction gears about the traction gears by said case, and having a diameter smaller than the traction gears and balancing gears connected to and rotatable with said transfer gears and interconnected with each other.

4. A differential gear mechanism including a driven case, differential gears supported by said case and rotatable therewith, a pair of side gears in mesh with said differential gears and balancing gears connected to said differential gears and in mesh with each other, the lead angle of the teeth of the side gears being greater than 45 degrees and less than 90 degrees to its axis and side gears having teeth that mesh with the differential gears the lead angle of the teeth being less than 45 degrees and more than zero degrees to its axis, said differential gears being smaller in diameter than said side gears.

5. A differential gear mechanism including a driven case, differential gears supported by said case and rotatable therewith, a pair of side gears in mesh with said differential gears and balancing gears connected to said differential gears and in mesh with each other, the lead angle of the teeth of the differential gears being 27 degrees plus or minus 2 degrees to its axis and side gears having teeth that mesh with the differential gears the lead angle of the teeth of the side gear being 63 degrees plus or minus 2 degrees to its axis.

6. A differential gear mechanism including a driven case, differential gears supported by said case and rotatable therewith, a pair of side gears in mesh with said differential gears and balancing gears connected to said differential gears and in mesh with each other, the lead angle of the teeth of the side differential gears being 35 degrees plus or minus 2 degrees to its axis and the side gears having teeth that mesh with the differential gears, the lead angle of the teeth of the side gears being 55 degrees plus or minus 2 degrees to its axis.

7. A differential gear mechanism including a driven case, a plurality of differential gears carried by said case in pairs and each gear of each pair being connected to the other by reversible gears, a pair of side gears rotatably mounted in said case and one of said differential gears of each pair being meshed with one of said side gears and the other side gear being in mesh with the other of the pair of differential gears, said differential and said gears comprising worm gears and worms with the lead angle of the teeth of the differential gears in the range more than 45 degrees and less than 90 degrees to the axis of the side gears to provide irreversible driving connection from the differential gears to the side gears, said differential gears being smaller in diameter than said side gears.

8. A differential mechanism including a driven case, differential gears rotatably carried by said case and side gears rotatably journalled in said case and driven by said differential gears, balancing gears interconnecting the differential gears, said side gears being worms and said differential gears being worm wheels, the lead angle of one of said side gears being different than the other side gears to provide a difference in relative effort on the meshing differential gear.

9. A differential mechanism comprising a cage including a circular end body having a flange for reception of a driving gear, a plurality of bearing posts secured to said body and extending parallel to each other, said posts each being formed with pairs of bearings, pairs of differential gears, each comprising a worm wheel, rotatably supported in adjacent bearing posts, reversible balancing gears for each pair of differential gears in engagement with each other, an end cap secured to the ends of said posts and holding said bearing posts means in spaced relation to each other, power take-off gears, each comprising a worm, rotatably journalled in the body and end cap and each being in engagement with opposite ones of said differential gears, said power take-off gears being of larger diameter than the differential gears.

10. A device as described in claim 9 where the lead angle of the worm is more than 45 degrees and less than 90 degrees to the axis of the worm.

11. A differential gear mechanism including a driven case, differential gears supported by said case and rotatable therewith, a pair of side gears in mesh with said differential gears and balancing gears connected to said differential gears and in mesh with each other, the lead angle of the teeth of the differential gears being between 27 and 35 degrees to its axis and having teeth that mesh with the side gears, the lead angle of the teeth of the side gears being between 63 and 55 degrees.

References Cited in the file of this patent
UNITED STATES PATENTS

| | | |
|---|---|---|
| 1,164,770 | Walter | Dec. 21, 1915 |
| 1,268,429 | Brown | June 4, 1918 |
| 1,294,040 | Brown | Feb. 11, 1919 |
| 1,373,657 | Finefrock | Apr. 5, 1921 |
| 1,399,045 | Bernstein | Dec. 6, 1921 |
| 1,968,278 | Bevis | July 31, 1934 |
| 2,022,141 | Morgan | Nov. 26, 1935 |
| 2,559,916 | Gleasman | July 10, 1951 |

FOREIGN PATENTS

| | | |
|---|---|---|
| 700,661 | Germany | Dec. 27, 1940 |
| 768,330 | France | May 14, 1934 |
| 893,311 | France | Jan. 24, 1944 |